UNITED STATES PATENT OFFICE.

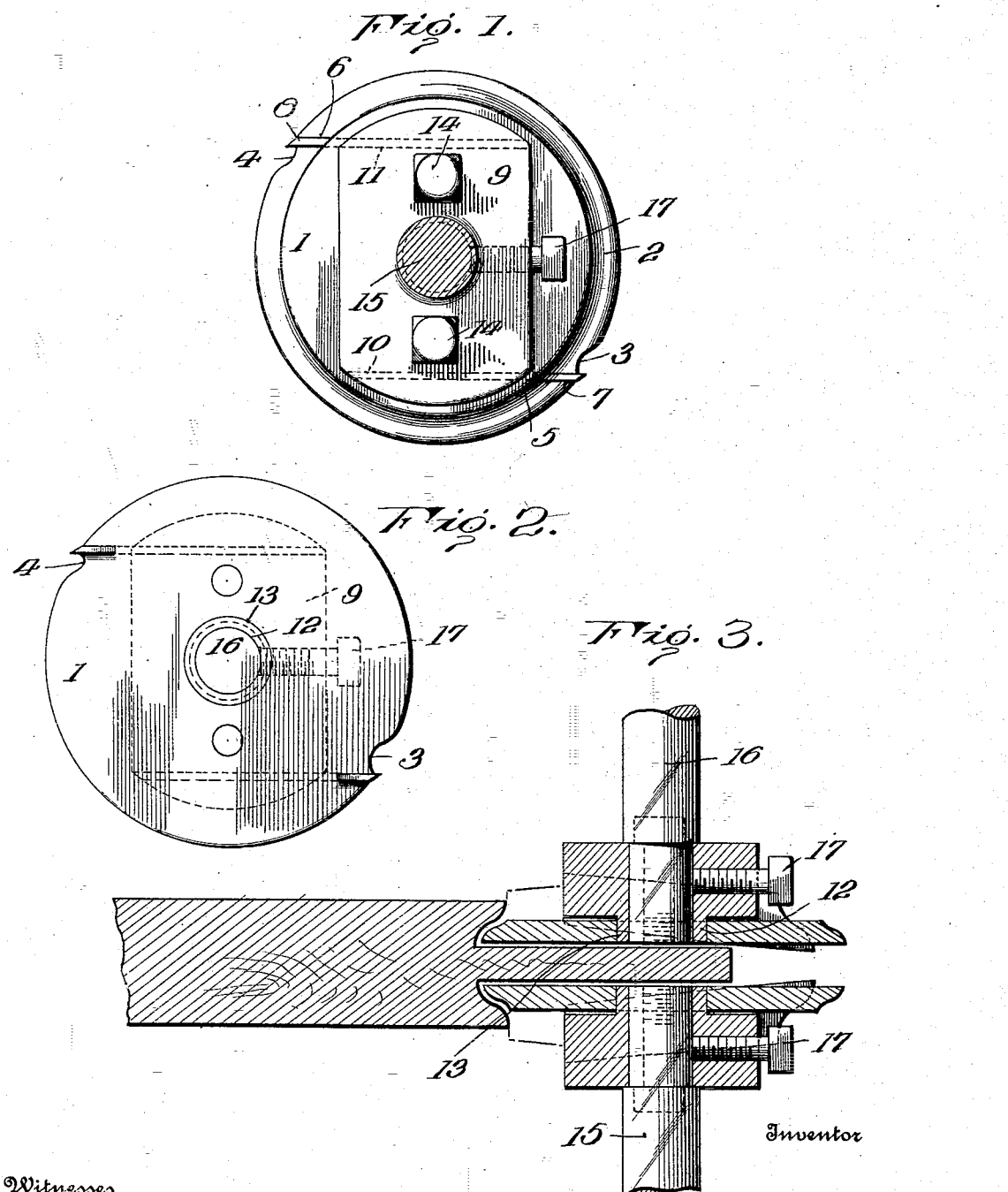

EMIL A. G. ENGLER, OF RED WING, MINNESOTA.

ROTARY CUTTER-HEAD.

1,172,776.  Specification of Letters Patent.  Patented Feb. 22, 1916.

Application filed May 5, 1915. Serial No. 25,934.

*To all whom it may concern:*

Be it known that I, EMIL A. G. ENGLER, a citizen of the United States, residing at Red Wing, in the county of Goodhue and State of Minnesota, have invented certain new and useful Improvements in Rotary Cutter-Heads, of which the following is a specification, reference being had therein to the accompanying drawing.

This invention relates to certain new and useful improvements in rotary cutter heads especially adapted to be used in connection with tenoning machines, shaping machines and various other similar machines; the object being to provide a rotary cutter head which is so constructed that exceedingly thin cutting knives formed of self-tempered, high-speed steel can be employed, means being provided for backing up the cutting knives in order to prevent the same from vibrating.

Another object of my invention is to provide a cutter head formed of two sections having registering grooves to receive the cutter knives, means being provided for clamping the sections together in order to securely hold the knives in position.

Another object of my invention is to provide a cutter head which is exceedingly simple and cheap in construction and one which is provided with means for attaching the same to the machine spindle in such a manner that the same can be readily attached or detached.

Other and further objects and advantages of the invention will be hereinafter set forth and the novel features thereof defined by the appended claims.

In the drawings—Figure 1, is a plan view showing the machine spindle in section; Fig. 2, is an inverted plan view; and Fig. 3, is a section through a pair of cutter heads arranged to operate upon the material to form a cope therein, one knife of each head being shown in dotted and dash lines and the other, in full lines.

Like numerals of reference refer to like parts in the several figures of the drawing.

In carrying out my invention, I employ a head formed of two sections comprising a disk section 1 having a beveled marginal edge 2 provided with peripheral recesses 3 and 4 forming a clearance for the cutting knives as will be later described, the face of said disk being provided with transversely arranged grooves 5 and 6 in which are adapted to be arranged cutting knives 7 and 8 formed of self-tempered high-speed steel approximately one-sixteenth of an inch thick and of the desired width, the cutting edges thereof being of the desired shape and are herein shown shaped to form the coping on a door rail. Mounted on the face of the disk is a clamping block 9 provided with grooves 10 and 11 adapted to receive the projecting portions of the knives 7 and 8 so as to clamp the knives securely in position upon the disks, said block being provided with a circular boss 12 extending into a central opening 13 formed in the disk as clearly shown in Fig. 3.

The disk 1 is provided with threaded bores to receive the threaded ends of clamping screws 14 which extend through openings formed in the block 9 so as to clamp the block in position on the disk so as to securely hold the knives in position within the registering grooves.

In Fig. 3, I show the application of a pair of my cutter heads to machine spindles 15 and 16 which are annularly reduced and extend into openings formed in the blocks 9 of the cutting heads and are secured therein by clamping screws 17 so as to lock the cutting heads in position upon the machine spindles, in such a position that the end of the spindle is flush with the face of the disk 1 of the cutter heads in order to allow the previously formed tenon to pass between the pair of cutting heads as shown in Fig. 3 so as to bring the cutting knives in position to form the coping on the door rail.

From the foregoing description, it will be seen that I have provided a cutter head formed of two sections having registering grooves to receive the cutting knives, said sections being provided with means for clamping the same together so as to clamp the knives between the sections in such a manner that exceedingly thin cutting knives can be employed, the cutting edges thereof being backed up by the disk member of the cutting head in order to prevent the same from vibrating. It will also be seen that by milling the registering grooves in the sections of the head, the cutting knives will fit snugly therein and be clamped between the sections when the clamping bolts are tightened so as to prevent the same from moving, when in operation.

I claim:

1. A cutter head, comprising a centrally apertured disk having a beveled marginal edge provided with peripheral recesses, said disk having grooves communicating with said recesses, knives mounted in said grooves, a block provided with a central boss extending into the central opening of said disk, said block being provided with grooves registering with the grooves of said disk and adapted to receive the projecting portions of said knives, means for clamping said block to a machine spindle, and means for clamping said block to said disk.

2. A sectional cutter head, comprising a disk member having a central opening and a marginal beveled portion provided with peripheral recesses, said disk member having grooves communicating with said recesses in one face thereof, an apertured block provided with a boss extending into the opening of said disk, said block being provided with grooves registering with the grooves of said disk, knives arranged within the grooves of said disk and block, said disk being provided with threaded bores, clamping bolts extending through said block into said threaded bores for clamping said block upon said disk, and means for fastening said head upon a machine spindle.

3. A sectional cutter head formed of a disk member having a central opening and a marginal beveled portion provided with peripheral recesses, one face of said disk being provided with grooves extending from said recesses, a block provided with a central apertured boss extending into said central opening of said disk, said block being provided with grooves registering with the grooves of said disk, cutting knives arranged within the grooves of said disk and block having cutting edges extending into the recesses of said disk, and bolts for clamping said block over the projecting portions of said knives.

4. A cutter head, comprising a centrally apertured disk provided with peripheral recesses, said disk having grooves communicating with said recesses, knives mounted in said grooves, said disk having a peripheral contour the same as the cutting edges of said knives, a block provided with a central boss extending into the central opening of said disk, said block being provided with grooves registering with the grooves of said disk and adapted to receive the projecting portions of said knives, means for clamping said block to a machine spindle, and means for clamping said block to said disk.

In testimony whereof I hereunto affix my signature in the presence of two witnesses.

EMIL A. G. ENGLER.

Witnesses:
 CHAS. M. STAFFORD,
 FRANK H. TANDED.

Copies of this patent may be obtained for five cents each, by addressing the "Commissioner of Patents, Washington, D. C."